3,012,843
PROCESS FOR THE COLORATION OF LINEAR POLYESTER FIBRES WITH NEW AZO DYESTUFFS
René Eugene Marcel Gangneux, Rouen, and Jacques Jules Jean Le Blanc, Oissel, France, assignors to Compagnie Française des Matieres Colorantes, Paris, France, a French company
No Drawing. Filed June 26, 1958, Ser. No. 744,650
Claims priority, application France June 27, 1957
2 Claims. (Cl. 8—55)

The present invention concerns new azo dyestuffs and the coloration of polyester fibres therewith.

It is known that it is possible to dye or print fibres based on polyesters by means of the so-called "plastosoluble" dyestuffs used for the dyeing or printing of fibres based on acetylcellulose. By the expression "polyester fibres" we mean quite generally the fibres obtained by the condensation of di-acids with di-alcohols and in particular those obtained by the poly-condensation of terephthalic acid with ethylene glycol. Such fibres are on the market under the names "Dacron," "Tergal" and "Tereylene." These dyestuffs can be applied either at ordinary pressure in the presence of carriers, the most common of which are orthophenylphenol and chlorinated derivatives of benzene, or under superatmospheric pressure and in the absence of carriers and in a shorter time. The shades obtained are generally fairly bright; in many cases, however, their fastness, especially to light, to wet tests and to sublimation, is not sufficient.

In addition, it is known that it is possible to dye fibres based on polyesters, under the conditions used for the plastosoluble dyestuffs, by means of mixtures of diazotisable bases and coupling compounds belonging to the series of arylides of orthohydroxycarboxylic acids; the corresponding pigments are formed on the fibre by simultaneous diazotisation and coupling. If the choice of the base and arylide, on the one hand, and the ratio between the quantities of these substances fixed on the fibre, on the other hand, are correct, the shades obtained are capable of meeting high standards so far as fastness to light and to wet tests is concerned. Although from the absolute point of view their resistance to sublimation is satisfactory, variations in shade, which may be considerable, are nevertheless observed in numerous cases at the time of preforming. In addition, this process of dyeing has the disadvantage of being lengthy, since two successive treatments of the fibres are necessary. Finally, this technique does not allow satisfactory yellow colorations to be obtained. The ease with which the acylacetyl derivatives of the aromatic amines saponify excludes their use under pressure and would lead to the use of the arylides of orthohydroxycarboxylic acids of the benzene series, the interest of which is very limited. Consequently, almost generally, the plastosoluble dyestuffs are called into use for the dyeing or printing of fibres based on polyesters when these have to be coloured yellow. Given that dyestuffs of low molecular weight are those with which one is mostly concerned, the fastness of the colours, especially to sublimation, is not sufficient.

It has already been proposed to dye fibres based on acetylcellulose by means of pyrazolone dyestuffs whose properties are much more like those of the pigments than those of the plastosoluble dyestuffs. Unfortunately these dyestuffs have, in general, a very poor resistance to sublimation and the pyrazolone dyestuffs recommended for dyeing acetylcellulose are excluded for use for the dyeing or printing of fibres based on polyesters.

We have now found that the dyestuffs of the general formula:

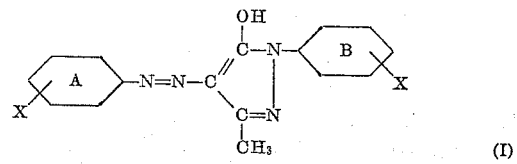

(I)

in which one X represents a member selected from the group consisting of the sulphonamido, N-alkylsulphonamido, N-arylsulphonamido, N-alkyl-N-arylsulphonamido, or N-(hydroxyalkyl)-sulphonamido groups and the other X represents a hydrogen atom, the benzene nuclei A and B being substituted in the remaining positions by members selected from the group consisting of the hydrogen and halogen atoms and the alkyl, alkoxy, hydroxyalkoxy and nitro groups, are of great interest for the dyeing or printing of polyester fibres owing to their shades and their remarkable fastness to sublimation.

These dyestuffs in the dispersed state can be used for dyeing polyester fibres either at ordinary pressure in the presence of carriers or under superatmospheric pressure with or without a carrier. They also find an interesting application in printing textile materials based on polyesters on a frame, on a roller or by the Vigoureux process. The alkylarylsulphonates and the condensation products of sulphonated aromatic compounds with aldehydes, more particularly the dinaphthylmethane sulphonates, are especially valuable auxiliary products. They assist considerably the taking up of the dyestuffs of general Formula I on the polyester fibres.

The following examples illustrate the present invention without restricting it; the parts given are parts by weight unless the contrary is indicated.

*Example 1*

152 parts of 5-nitro-4-aminotoluene are made into a paste in 250 parts of water and 250 parts of 19° Bé. hydrochloric acid and after the addition of 500 parts of ice, are diazotised by means of 138 parts by volume of a solution containing 50% by weight of sodium nitrite. The diazo compound so obtained is introduced into a solution of 253 parts of 1-(3'-sulphonamido-phenyl)-3-methyl-5-pyrazolone in 1000 parts of water and 115 parts by volume of a 35° Bé. solution of caustic soda, to which has been added 300 parts of crystalline sodium acetate. The dyestuff obtained is then isolated.

It can be used for dyeing, for example, in the following way: 3 parts of the sodium salt of orthophenylphenol and 3 parts of diammonium phosphate are introduced into 1000 parts of lukewarm water, and made into a paste in this bath are one part of the dyestuff obtained above and 2 parts of the sodium salt of dinaphthylmethanedisulphonic acid. 100 parts of polyester fibres are degreased in the hot by means of a solution containing 1 to 2 grams per litre of a mixture of derivatives of ethylene oxide and arylalkylsulphonate. The fibres thus degreased are introduced into the dyebath and dyed for one hour at 100° C. Following this operation the fibres are treated in the hot in an alkaline reducing bath containing 1 to 2 grams per litre of an alkylphenol/ethylene oxide condensate. The polyester fibre is dyed a golden yellow shade fast to wet tests, light, rubbing and sublimation. By dyeing at 130–135° C., one could work in the absence of orthophenylphenol.

Example 2

By replacing the 5-nitro-4-aminotoluene of Example 1 with 258 parts of 4-N-butylsulphonamido-2-amino-anisole and the 1-(3'-sulphonamido-phenyl)-3-methyl-5-pyrazolone with 174 parts of 1-phenyl-3-methyl-5-pyrazolone, a dyestuff of formula:

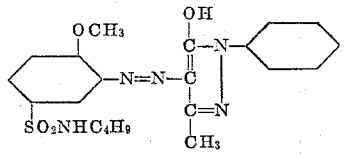

(II)

is obtained.

One part of this dyestuff in the form of a paste and 2 parts of the sodium salt of dinaphthylmethanedisulphonic acid are introduced into 1000 parts of water. 100 parts of polyester fibres, previously degreased, are introduced into an apparatus allowing operation under pressure, and dyed at 130–135° C. for an hour. The fibres are then treated in the hot in an alkaline reducing bath containing 1 to 2 grams per litre of an alkylphenol/ethylene oxide condensate. The polyester fibres are dyed a bright yellow shade, displaying all the qualities of that obtained with the dyestuff of Example 1.

Example 3

A dye bath is prepared as indicated in Example 1, and there is made into a paste therewith one part of the dyestuff of formula:

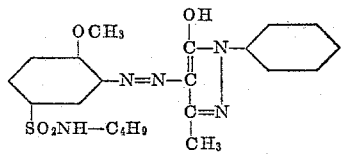

and 2 parts of the sodium salt of dinaphthylmethanedisulphonic acid. 100 parts of a mixed material containing fibres of polyesters and wool, previously degreased, are introduced and are dyed at 100° C. for one hour. The material is then treated at about 45° C. by means of an alkaline reducing bath containing 1 to 2 grams per litre of an alkyl phenol/ethylene oxide condensate. The polyester fibre is coloured a yellow shade possessing excellent fastness while the wool is unaffected.

Example 4

A printing paste is prepared from the following components:

Dyestuff of formula     Parts

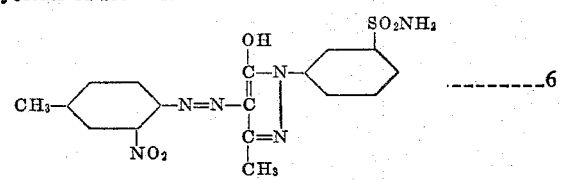

---------- 6

| | |
|---|---|
| Sodium dinaphthylmethanedisulphonate | 14 |
| Monoethyl ether of ethylene glycol | 50 |
| Water | 300 |
| Aqueous solution of sodium chlorate (300 g. per litre) | 30 |
| Starch-tragacanth thickener | 600 | and it is applied on a channelled roller to a fabric of polyester fibres previously desized by alkaline washing in the hot. The colour is fixed by steaming under pressure at 130–140° C. The material is rinsed and treated in the hot with an alkaline reducing bath containing 1 to 2 grams per litre of an alkyl-phenol/ethylene oxide condensate.

The fabric is coloured a yellow shade endowed with excellent fastness, the uncoloured parts being perfectly white.

The dyestuffs, defined in the following table by means of the bases and coupling compounds from which they are prepared, are applied to the polyester fibres by the processes of the preceding examples:

| Example | Diazotisable base | Coupling compound | Shade |
|---|---|---|---|
| 5 | 3-N-phenylsulphonamido-4-methyl-1-aminobenzene. | 1-phenyl-e-methyl-5-pyrazolone. | reddish yellow. |
| 6 | 3-N-phenyl-N-ethylsulphonamido-4-methyl-1-aminobenzene. | do | Do. |
| 7 | 5-sulphonamido-2-chloro-1-aminobenzene. | do | Do. |
| 8 | 5-N-diethylsulphonamido-2-methoxy-1-aminobenzene. | 1-(2'-chlorophenyl)-3-methyl-5-pyrozolone. | bright yellow. |
| 9 | 5-carbamoyl-2-methoxy-1-aminobenzene. | 1-(4'-chlorophenyl)-3-methyl-5-pyrazolone. | reddish yellow. |
| 10 | N-(β-hydroxyethyl)-4-sulphonamido-2-methoxy 5 methyl-1-aminobenzene. | do | Do. |
| 11 | 2-chloro-1-aminobenzene. | 1-(3'-sulphonamidophenyl)-3-methyl-5-pyrazolone. | pure yellow. |
| 12 | 2-nitro-1-aminobenzene. | do | bright orange yellow. |
| 13 | 4-nitro-1-aminobenzene. | do | brown yellow. |
| 14 | 4-nitro-2-chloro-1-aminobenzene. | do | orange yellow. |
| 15 | 2:5-dichloro-1-aminoaminobenzene. | do | pure yellow. |
| 16 | 3-N-phenyl-N-ethylsulphonamido-4-methyl-1-aminobenzene. | do | bright yellow. |

We claim:

1. Process for the coloration of linear polyester fibres which comprises dyeing the fibres with an azo dyestuff on the following general formula:

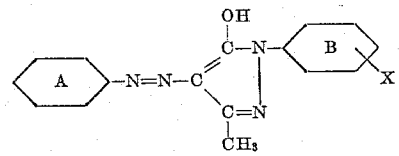

in which X represents a member selected from the group consisting of sulphonamido, N-alkylsulphonamido, N-arylsulphonamido, N-alkyl N-arylsulphonamido and N-(hydroxyalkyl)sulphonamido groups, the said alkyl groups being lower alkyl groups, and the benzene nuclei A and B are substituted by a member selected from the group consisting of the hydrogen and chlorine atoms and the lower alkyl, lower alkoxy and nitro groups.

2. Process for the coloration of linear polyester fibres which comprises printing the fibres with an azo dyestuff of the following general formula:

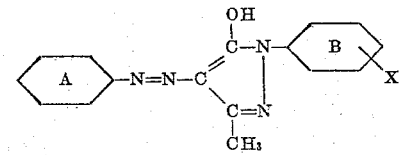

in which X represents a member selected from the group consisting of sulphonamido, N-alkylsulphonamido, N-arylsulphonamido, N-alkyl N-arylsulphonamido and N-(hydroxyalkyl)-sulphonamido groups, the said alkyl groups being lower alkyl groups, and the benzene nuclei A and B are substituted by a member selected from the group consisting of the hydrogen and chlorine atoms and the lower alkyl, lower alkoxy and nitro groups.

(References on following page)

References Cited in the file of this patent

UNITED STATES PATENTS

| | | |
|---|---|---|
| 1,718,882 | Schwenk et al. | June 25, 1929 |
| 2,228,303 | Fischer | Jan. 14, 1941 |
| 2,330,828 | Lubowe et al. | Oct. 5, 1943 |

FOREIGN PATENTS

| | | |
|---|---|---|
| 543,567 | Great Britain | Mar. 4, 1942 |
| 1,115,827 | France | Jan. 16, 1956 |

OTHER REFERENCES

Remington: Amer. Dyest. Rep., December 22, 1952, pp. 859–860.

Zimmerman: Amer. Dyest. Rep., April 25, 1955, p. 296.

Fern: J.S.D.C., December 1955, pp. 840–844.